United States Patent [19]

Stopa et al.

[11] Patent Number: 4,972,185

[45] Date of Patent: Nov. 20, 1990

[54] RADIANT ENERGY SIGNAL TRANSMITTER

[75] Inventors: James L. Stopa, Old Saybrook, Conn.; Earl B. Hoekman, Roseville, Minn.

[73] Assignee: Minnesota Mining and Manufacturing Company, St. Paul, Minn.

[21] Appl. No.: 344,748

[22] Filed: Apr. 28, 1989

[51] Int. Cl.[5] .......................... G08C 19/00; G02F 1/00

[52] U.S. Cl. .......................... 340/825.720; 315/200 R; 340/825.29; 358/194.1; 455/603

[58] Field of Search .............. 340/906, 825.69, 825.72, 340/825.73, 825.64; 328/72, 73, 74; 455/603; 250/206; 358/194.1; 315/200 A, 200 R, 241 S, DIG. 7; 320/9

[56] References Cited

U.S. PATENT DOCUMENTS

| | | | |
|---|---|---|---|
| 2,355,607 | 8/1944 | Shepherd | 340/906 |
| 2,457,502 | 12/1948 | Shepherd | 340/906 |
| 3,550,078 | 12/1970 | Long | 340/906 |
| 3,906,366 | 9/1975 | Minami et al. | 455/603 |
| 4,016,532 | 4/1977 | Rose | 340/906 |
| 4,162,477 | 7/1979 | Munkberg | 340/906 |
| 4,218,681 | 8/1980 | Hormann | 340/825.72 X |
| 4,234,967 | 11/1980 | Henschel | 340/906 |
| 4,321,507 | 3/1982 | Bosnak | 315/200 A X |
| 4,349,810 | 9/1982 | Kugo et al. | 315/200 A X |
| 4,443,783 | 4/1984 | Mitchell | 340/906 |
| 4,775,865 | 10/1988 | Smith et al. | 340/906 |

*Primary Examiner*—Ulysses Weldon

*Attorney, Agent, or Firm*—Donald M. Sell; Walter N. Kirn; William B. Barte

[57] ABSTRACT

An radiant energy transmitter that includes a d.c. to d.c. converter, a d.c. energy storage circuit portion, a triggered radiant energy signaling device, a trigger pulse circuit to initiate operation of the signaling device and an operator adjustable trigger pulse timer circuit portion supplying signals to the trigger pulse circuit at a repetition rate selected by an operator with each signal causing the trigger pulse circuit to provide a trigger pulse to initiate an operation of the signaling device.

4 Claims, 2 Drawing Sheets

Fig. 1

RADIANT ENERGY SIGNAL TRANSMITTER

FIELD OF THE INVENTION

The invention presented herein relates to radiant energy signal transmitters used by priority vehicles for remotely controlling traffic signals wherein such transmitters include a triggered radiant energy signaling device, a trigger pulse circuit portion supplying trigger signals to the signaling device and a trigger pulse timer circuit portion for timing the operation of the trigger pulse circuit portion. The invention in particular relates to the trigger pulse timer of the transmitter which allows the frequency of the signals supplied to the trigger pulse circuit to be easily changed by the user.

BACKGROUND OF THE INVENTION

Radiant energy signal transmitters are currently being used with public safety vehicles, such as fire and police vehicles, for remotely controlling traffic signals at intersections wherein the signal transmitter is turned on and off at a desired rate. Fire trucks may, for example, use a signal transmitter operating at a frequency that is effective to obtain control of traffic signals at an intersection on a priority basis over the signal provided by a transmitter operating at another frequency that is carried by a police vehicle. Such a multiple priority control system is disclosed in U.S. Pat. No. 4,162,477 to John A. Munkberg.

Such prior radiant energy signal transmitters include a d.c. to d.c. converter, a d.c. storage circuit portion, a triggered radiant energy signaling device, a trigger pulse circuit portion and a trigger pulse timer circuit portion. The d.c. to d.c. converter is energized by the vehicle electrical system to convert the vehicle d.c. voltage to a higher d.c. voltage which is applied to the d.c. storage circuit portion for storage of the d.c. energy. The trigger pulse timer circuit portion provides repetitive signals to a trigger pulse circuit portion, each of such signals causing the trigger pulse circuit to provide a trigger pulse to the triggered radiant energy signaling device to initiate its operation by providing a conductive path for rapid discharge of the d.c. energy stored by the d.c. storage circuit to create a high intensity flash of light. The trigger pulse timers for signal transmitters of this type that are used with systems providing for the remote control of traffic signals at intersections have been manufactured to supply signals at a single rate determined by the priority level of the vehicle with which the transmitter is to be used. Such trigger pulse timers have involved the use of binary counters for obtaining a desired repetition rate.

Such prior radiant energy signal transmitters do not provide a means by which the operator of a vehicle having the radiant energy signal transmitter can change the rate or frequency of operation of such a transmitter to obtain a different operating priority frequency or a frequency of operation that is a non-controlling frequency allowing the radiant energy signal being transmitted to be detected for another purpose or merely to provide a visible radiant energy signal that serves only to make the operators of other vehicles or pedestrians aware of the vehicle having the transmitter. Binary counters as used in the prior transmitters for determining the frequency of operation of the transmitter do not provide for the changing of the operating frequency in a manner that would be accountable to an operator of a vehicle having such a transmitter.

SUMMARY OF THE INVENTION

The invention presented herein provides a solution to the deficiency present in the operation of prior vehicle mounted radiant energy transmitters. A radiant energy transmitter embodying the invention presented herein includes a d.c. to d.c. converter which converts a low d.c. voltage to a higher d.c. voltage; a d.c. storage circuit portion for storing d.c. energy from the d.c. to d.c. converter; a triggered radiant energy signaling device connected to the d.c. storage circuit; a trigger pulse circuit portion connected to the triggered radiant energy signaling device to supply a trigger pulse to initiate operation of the triggered radiant energy signaling device and an operator adjustable trigger pulse timer circuit portion connected to the trigger pulse circuit for supplying pulse timing signals at a repetition rate selected by an operator with each repetition of such signal causing the trigger pulse circuit to provide a trigger pulse. The operator adjustable trigger pulse timer circuit portion includes a crystal controlled means that provides a base time signal; a first decade counter that receives the base time signal for providing a units count output of the base time signal; a second decade counter connected to the first decade counter for providing a tens count output of the base time signal; and means connectable to an operator selected units and tens count output from the first and second decade counters respectively, for providing a signal to the trigger pulse circuit portion when an output is presented at the desired units and tens count outputs. Such a trigger pulse timer allows the operator of the radiant energy transmitter to easily change the frequency of the pulse timing signals supplied to the trigger pulse circuit portion for initiating operation of the triggered radiant energy signaling device. The frequency of the pulse timing signals provided to the trigger pulse circuit portion is, of course, the frequency of the base time signal divided by the decimal number established by the selected unit and tens count output.

BRIEF DESCRIPTION OF THE DRAWING

The invention presented herein will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

DETAILED DESCRIPTION

Figure 1:
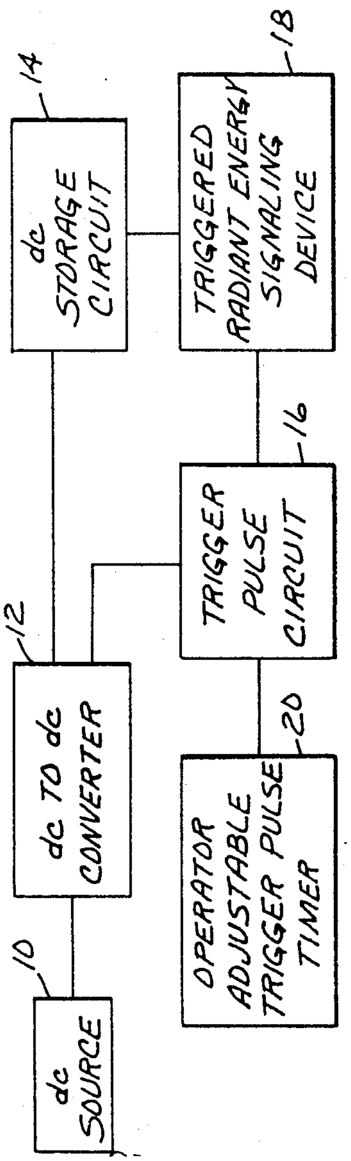
FIG. 1 is a block diagram of a radiant energy signal transmitter embodying the invention presented herein.

Referring to FIG. 1, prior known radiant energy signal transmitters, which are powered from a d.c. supply 10, include a d.c. to d.c. converter 12 which serves to convert the d.c. voltage from the d.c. supply 10 to a higher d.c. voltage. Such prior known transmitters also have a d.c. storage circuit 14 which stores d.c. energy from the converter 12. A trigger pulse circuit 16 is also used which receives a voltage from the converter 12 and has its output connected to the triggered radiant energy signaling device 18. The device 18 can be a gas discharge light source having a trigger electrode that receives a high voltage trigger signal from the output of trigger pulse circuit 16 to initiate conduction of the gas in the gas discharge light source to provide a conductive path for rapid discharge of the voltage stored by the d.c. storage circuit 14. This rapid discharge produces an intense flash of light with the circuitry repeating such discharge at a rate determined by the trigger pulse timer 20. The trigger pulse timer 20 of FIG. 1 differs in function from those used in the prior known transmitters in that the rate or frequency of its operation can be easily selected by the operator of the signal transmitter. Exemplary prior art circuits of the type just described are disclosed in U.S. Pat. No. 4,234,967 to John P. Henschel and U.S. Pat. No. 4,321,507 to John J. Bosnak.

Figure 2:
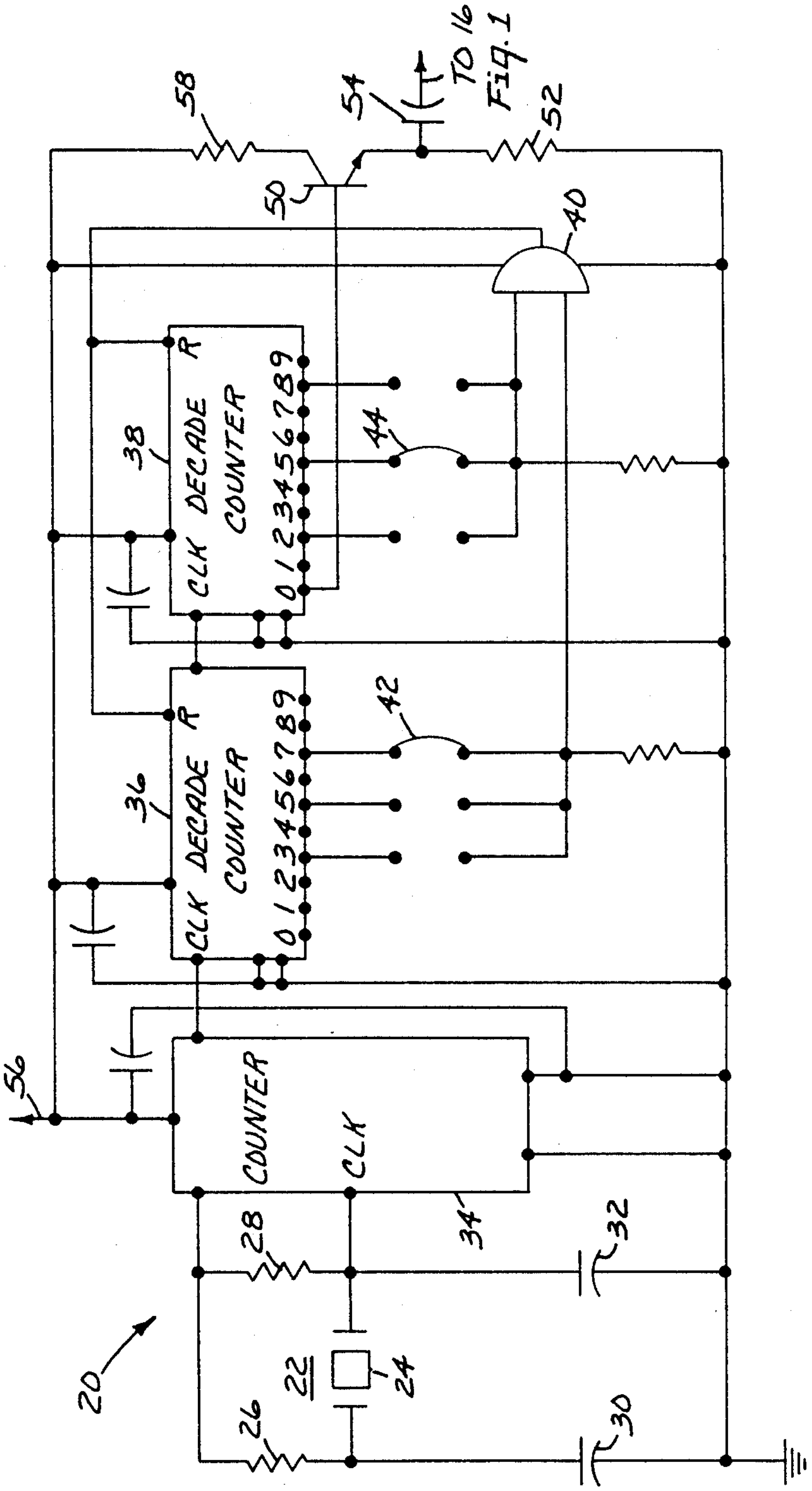
FIG. 2 is a schematic diagram of the trigger pulse timer of FIG. 1.

Referring to FIG. 2 of the drawing, a schematic diagram is shown for the trigger pulse timer 20 of FIG. 1. The trigger pulse timer 20 includes crystal oscillator 22 having a crystal 24 plus resistors 26 and 28 and capacitors 30 and 32. Resistor 26 and capacitor 30 are connected in series as are resistor 28 and capacitor 32 with capacitors 30 and 32 connected to ground and the resistors 26 and 28 connected to a counter 34 that is included as a part of the portion of trigger pulse timer 20 that provides a base time signal. The connection common to resistor 26 and capacitor 30 is connected to one side of the crystal 24 with the connection common to resistor 28 and capacitor 32 similarly connected to the other side of crystal 24 and to the clock input of the counter 34. The counter 34 includes an amplifier and is used to divide the frequency of the crystal oscillator to obtain a desired base time signal. The counter can be provided by a digital type of counter circuit available under the type designation 4060B from Motorola, Inc., Semiconductor Products Sector, 3102 North 56th Street, Phoenix, Ariz. 85018. In the case where a base time signal is desired that is repeated every 1.25 milliseconds, the crystal oscillator 22 having a frequency of 3.2768 megahertz can be used with the counter 34 serving to divide such frequency by 4096 or $2^{12}$ to obtain an 800 Hz base time signal. If the frequency of the signal from counter 34 is then divided by 57, 14.035 Hz pulse timing signal will be provided, having a period of 71.25 milliseconds, which is the high priority signal used for the commercially available multiple priority remote control system for the remote control of a control system for a traffic intersection described in U.S. Pat. No. 4,162,477 to John A. Munkberg. A divisor of 83 provides a signal every 103.75 milliseconds which is the low priority signal used for the commercial available version of the aforementioned multiple priority remote control systems.

Figure 3:
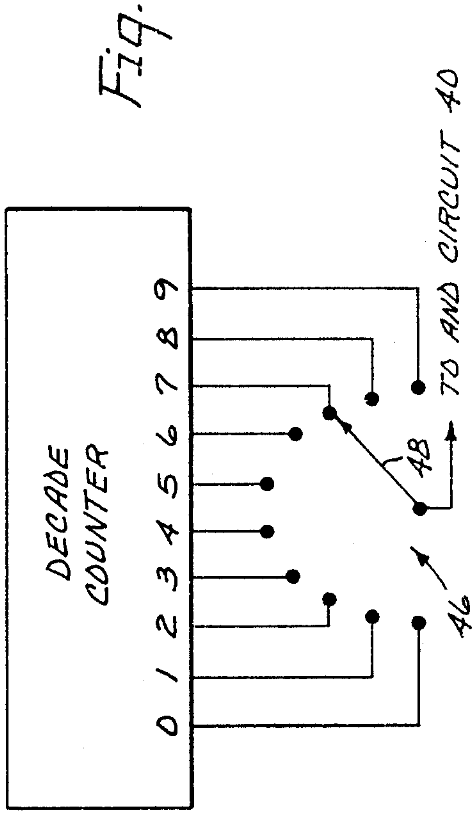
FIG. 3 is a schematic diagram of an alternative connection for the decade counters shown in FIG. 2.

Selection by an operator of the divisors 57 and 83 is easy in that the timer 20 includes two decade counters 36 and 38 wherein counter 36 is connected to receive the signals from counter 34 to provide a units count at its outputs that are numbered 0–9 in FIG. 2. Decade counter 36 in turn is connected to counter 38 for receiving a signal for every ten signals received by counter 36 to provide a tens count at its outputs that are numbered 0–9 in FIG. 2. For purposes of illustration, connecting points are shown opposite unit count outputs 3, 5 and 7 of counter 36 with connecting points shown opposite tens count outputs 2, 5 and 8 of counter 38. The connecting points for counter 36 are connected together to provide one input for an AND circuit 40 with the connecting points for counter 38 being connected together to provide the second input for AND circuit 40. Removable wire jumpers such as 42 and 44 shown in FIG. 2, can be used to connect a selected units and tens count output to the AND circuit 40. The selection shown in FIG. 2 connects 5 of the tens count output of counter 38 and 7 of the units count output of counter 36 to the AND circuit 40 causing the frequency of the signal from counter 34 to be divided by 57. This means the time between signals at the output of the AND circuit 40 is 57 times the time between the base time signals provided to the counter 36 from the counter 34. If the jumper wires 42 and 44 were used to connect the units count output 3 of counter 36 and the tens count output 8 of counter 38 to AND circuit 40, the time between signals at the output of the AND circuit 40 would be 83 times the time between the base time signals provided to the counter 36 from the counter 34. Thus, the trigger pulse timer circuit 20 can be readily connected by a user or at the point of manufacture to provide either the high or low priority signals referred to earlier. The presence of a third possible connecting point for each of the counters makes it possible to select a number of other multiples. It can be appreciated that other ways for making connections from the units and tens count outputs are available such as a switch for each of the outputs that may be used or the use of a rotary type switch 46 for each decade counter, as shown in FIG. 3, where a separate fixed contact is provided for and connected to each of the outputs of a decade counter that may be used with the rotary contact 48 of the switch 46 connected to an input of AND circuit 40.

The trigger pulse timer circuit portion 20 also includes an electronic switching device 50, which can take the form of a transistor, such as the NPN type transistor shown in FIG. 2, which is turned on once an output signal is presented at both of the connected units and tens count outputs to supply a signal to the trigger pulse circuit 16. A positive going signal is used to cause the switching device 50 to conduct and is obtained from the "0" output of the tens count output. Such a positive going signal is presented when the decade counters 36 and 38 are reset in response to an output signal being presented at both of the connected units and tens count outputs. The occurrence of such count output signals is detected by the connected AND circuit 40 which operates to provide a signal at its output that is directed to the reset input of the decade counters 36 and 38. Resetting of the counters produces a positive going signal at the "0" output of the tens count output of counter 38 which is effective to turn on the transistor 50. Current flow through resistor 52, which is connected to the emitter of the transistor 50, produces a voltage signal at the emitter-resistor juncture which is coupled to the trigger pulse circuit portion 16 via a capacitor 54. The counters 34, 36 and 38 are connected via the conductor 56 to a d.c. supply (not shown) which is energized from the d.c. source 10. The collector of transistor 50 is connected to the conductor 56 via a resistor 58.

The radiant energy transmitter that has been described enables the user to establish a desired frequency for operation of the signaling device of the transmitter based on the output of a decimal divider provided by decade counters 36 and 38 requiring the user to merely connect the appropriate units and tens count outputs provided by counters 36 and 38 to the AND circuit 40. Such a transmitter mounted on a vehicle can thus be readily programmed to provide a frequency of operation for, the transmitter for use of the vehicle according to the priority assigned to the vehicle.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

We claim:

1. A radiant energy transmitter including a d.c. to d.c. converter for converting a low d.c. voltage to a higher d.c. voltage; a d.c. storage circuit for storing d.c. energy from said d.c. to d.c. converter; a triggered radiant energy signaling device connected to said d.c. storage circuit; a trigger pulse circuit connected to supply a trigger pulse to said triggered radiant energy signaling device to initiate operation of said triggered radiant energy signaling device and an operator adjustable timer circuit coupled to said trigger pulse circuit for supplying thereto a pulse timing signal having a repetition rate selected by an operator, each repetition causing said trigger pulse circuit to provide a said trigger pulse, wherein said operator adjustable timer circuit comprises a crystal controlled means for providing a base time signal having a predetermined repetition rate, decade counter means responsive to said base time signal for enabling a said pulse timing signal when a given number of repetitions of said base time signal are counted, and operator controlled contact means selectively connected to said decade counter means for establishing the said given number of base time signal repetitions required prior to enabling said pulse timing signal.

2. A radiant energy transmitter according to claim 1 wherein said decade counter means includes:

a first decade counter connected to said crystal controlled means for providing a units count output of the base time signal;

a second decade counter connected to said first decade counter for providing a tens count output of the base time signal; and wherein said operator controlled contact means includes mean s selectively connected to said first and second decade counters for selecting a desired units count output and a desired tens count output from said first and second decade counters, respectively, and for enabling a said pulse timing signal to said trigger pulse circuit when an output is present at both the operator selected units and ten count outputs.

3. A radiant energy transmitter according to claim 2 wherein said enabling means includes an ANd circuit and an electronic switching device, said AND circuit providing an output signal when both a said desired units count output and a said desired tens count output are present, the output of said AND circuit being connected to said first and second decade counters for resetting said first and second decade counters, and said electronic switching device being connected to turn on upon receipt of a "0" tens count output of said second decade counter when said second decade counter is reset, and for thereupon providing a said pulse time signal to the trigger pulse circuit.

4. A radiant energy transmitter according to claim 3 wherein said electronic switching device is a transistor.

* * * * *